United States Patent
Jeol et al.

(10) Patent No.: US 10,662,328 B2
(45) Date of Patent: *May 26, 2020

(54) COMPATIBILIZED POLYMER COMPOSITIONS

(71) Applicant: SOLVAY SPECIALTY POLYMERS USA, LLC, Alpharetta, GA (US)

(72) Inventors: Stéphane Jeol, Cumming, GA (US); David B. Thomas, Atlanta, GA (US); Maryam Momtaz, Hamme-Mille (BE); Chantal Louis, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/096,390

(22) PCT Filed: Apr. 28, 2017

(86) PCT No.: PCT/EP2017/060222
§ 371 (c)(1),
(2) Date: Oct. 25, 2018

(87) PCT Pub. No.: WO2017/186925
PCT Pub. Date: Nov. 2, 2017

(65) Prior Publication Data
US 2019/0127582 A1    May 2, 2019

Related U.S. Application Data

(60) Provisional application No. 62/329,499, filed on Apr. 29, 2016.

(30) Foreign Application Priority Data

Sep. 8, 2016    (EP) .................................... 16187799

(51) Int. Cl.
| | |
|---|---|
| *C08L 81/06* | (2006.01) |
| *C08J 3/20* | (2006.01) |
| *C08L 71/12* | (2006.01) |
| *C08J 3/00* | (2006.01) |
| *C08G 75/23* | (2006.01) |
| *C08L 71/00* | (2006.01) |

(52) U.S. Cl.
CPC .............. *C08L 81/06* (2013.01); *C08G 75/23* (2013.01); *C08J 3/005* (2013.01); *C08J 3/201* (2013.01); *C08J 3/203* (2013.01); *C08L 71/00* (2013.01); *C08L 71/12* (2013.01); *C08G 2650/40* (2013.01); *C08J 2365/00* (2013.01); *C08J 2371/00* (2013.01); *C08J 2381/06* (2013.01)

(58) Field of Classification Search
CPC . C08G 75/23; C08J 3/005; C08J 3/203; C08J 3/201; C08L 71/12; C08L 81/06; C08L 71/00
USPC ......................................................... 524/417
See application file for complete search history.

(56) References Cited

U.S. PATENT DOCUMENTS

| | | |
|---|---|---|
| 4,968,758 A | 11/1990 | Matzner et al. |
| 5,723,525 A | 3/1998 | Elbl-Weiser |
| 2009/0326153 A1 | 12/2009 | Hiroi et al. |
| 2011/0269879 A1 | 11/2011 | Kim et al. |

FOREIGN PATENT DOCUMENTS

| | | | |
|---|---|---|---|
| DE | 3843438 A1 | | 6/1990 |
| EP | 125816 A2 | | 11/1984 |
| EP | 176988 A1 | | 4/1986 |
| EP | 266791 A2 | | 5/1988 |
| EP | 0 417 908 | * | 3/1991 |
| EP | 0 635 548 | * | 1/1995 |
| EP | 635548 A1 | | 1/1995 |
| EP | 2 067 823 | * | 6/2009 |
| WO | 8606389 A1 | | 11/1986 |
| WO | WO 2014/072447 | * | 5/2014 |

* cited by examiner

*Primary Examiner* — Doris L Lee

(57) ABSTRACT

A polymer composition includes components selected from: (i) at least one a poly(aryl ether ketone) (PAEK), (ii) a poly(ether sulfone) (PES), (iii) a reactive poly(ether sulfone) (rPES), (iv) a reactive poly(aryl ether ketone) (rPAEK), (v) an acid component, and (vi) at least one alkali metal carbonate. Preferably, the polymer composition is free or substantially free of solvent. A method includes melt mixing the components of the polymer composition.

15 Claims, 6 Drawing Sheets

COMPATIBILIZED POLYMER COMPOSITIONS

RELATED APPLICATIONS

This application claims priority to U.S. provisional application No. 62/329,499—filed Apr. 29, 2016—and to European patent application No. 16187799.8—filed Sep. 8, 2016—, the whole content of each of these applications being incorporated herein by reference for all purposes.

FIELD OF THE INVENTION

The present invention relates to high-performance compatibilized polymer compositions including poly(aryl ether ketone) (PAEK) and poly(ether sulfone) (PES).

BACKGROUND

Polymers may be blended to achieve new compositions with desirable properties; however, the vast majority of polymers are immiscible with each other. Attempts to blend polymers often results in heterogeneous multi-phase compositions when the polymers are immiscible with each other. Such compositions may exhibit several thermal transition temperatures (Tg, Tm), usually exhibit poor mechanical properties, and suffer from delamination and/or aesthetical defects.

Indeed, the mechanical properties and ease of processing of a particular blend depend on the degree of compatibility of the polymer components. The main polymer component is usually referred to as the continuous phase or matrix, whereas the minor polymer component is typically defined as the dispersed phase. The degree of compatibility can be characterized by the dimensions of the dispersed phase in the continuous phase and the level of adhesion between the matrix and the dispersed phase. Certain highly immiscible blends are impossible to extrude in normal operating conditions due to a high die swell and are therefore not commercially available.

Blends of PAEKs and PES are an example of such a blend. PAEKs are known to have excellent strength and chemical resistance, and PES is known to have excellent mechanical properties such as a high modulus and a low melt viscosity advantageous for making shaped articles with thin portions. Therefore, it would be desirable to blend these polymers to achieve a combination of their beneficial properties; however blends of PAEKs and PES are known to be highly immiscible, exhibiting extreme die swell and low melt strength. As a result, there are currently no commercial blends of these polymers.

Accordingly, a need exists for new blends of PAEKs and PES having increased compatibility.

DETAILED DESCRIPTION OF PREFERRED EMBODIMENTS

Figure 1:
FIG. 1 is a scanning electron microscopy (SEM) image of the polymer composition of Comparative Example 1.

Applicants have now surprisingly discovered that it is possible to prepare compatible blends of PAEKs and PES.

Exemplary embodiments are directed to a polymer composition including components selected from the group consisting of: (i) at least one a poly(aryl ether ketone) (PAEK), (ii) a poly(ether sulfone) (PES), (iii) a reactive poly(ether sulfone) (rPES), (iv) a reactive poly(aryl ether ketone) (rPAEK), (v) an acid component having a pKa≤7.5, and (vi) about 0.05 to about 2 wt. % of at least one alkali metal carbonate, based on the total weight of polymers in the polymer composition, where the polymer composition includes:

components (i), (ii), (iii), (vi), and optionally (v),
components (i), (ii), (iv), (vi), and optionally (v),
components (i), (ii), (v), and (vi),
components (iii), (iv), and (vi),
components (iii), (iv), (v), and (vi),
components (i), (iii), (vi), and optionally (v), or
components (ii), (iv), (vi), and optionally (v).

In some embodiments, the polymer composition is substantially free of solvents, that-is-to-say that the composition does not comprise solvent and comprises solvent(s) in an amount not exceeding 2 wt. % (based on the total weight of the composition), for example less than 1 wt. %, less than 0.5 wt. % or less than 0.1 wt. %.

For the sake of clarity, throughout the present application:
the term "alkali metal carbonate" includes an alkali metal carbonate and any reagent from which the alkali metal carbonate can be derived in situ during processing at high temperature, for example alkali metal bicarbonate.
the term "solvent" means a liquid in which at least one of the polymers in the polymer composition will at least partially dissolve;
"substantially free of solvent" means less than 2 wt. % of solvent, for example less than 1 wt. %, less than 0.5 wt. % or less than 0.1 wt. %;
"substantially free of rPES and/or rPAEKs" means less than 2 wt. % of rPES and/or rPAEKs, based on the total weight of the polymers in the polymer composition;
"substantially simultaneously" means within 30 seconds;
"substantially free of die swell" means less than 5% die swell;
"substantially free of nitro or nitrile end groups" means less than 1 micro equivalents per gram of nitro or nitrile end groups;
the term "halogen" includes fluorine, chlorine, bromine, and iodine, unless indicated otherwise; and
the adjective "aromatic" denotes any mono- or polynuclear cyclic group (or moiety) having a number of it electrons equal to 4n+2, where n is 1 or any positive integer; an aromatic group (or moiety) can be an aryl and arylene group (or moiety).

Generally, the PAEK or PES may have a weight average molecular weight (Mw) ranging from about 5,000 g/mol to about 150,000 g/mol, preferably from about 10,000 g/mol to about 100,000 g/mol, as determined by Gel Permeation Chromatography (GPC).

In the present application:
any description, even though described in relation to a specific embodiment, is applicable to and interchangeable with other embodiments of the present disclosure;

where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

Poly(Aryl Ether Ketone)S (PAEK)

As used herein, a "poly(aryl ether ketone) (PAEK)" denotes any polymer comprising more than 50 mol % of recurring units ($R_{PAEK}$) comprising a Ar'—C(=O)—Ar* group, where Ar' and Ar*, equal to or different from each other, are aromatic groups. The recurring units ($R_{PAEK}$) are selected from the group consisting of units of formulae (J-A) to (J-D) below:

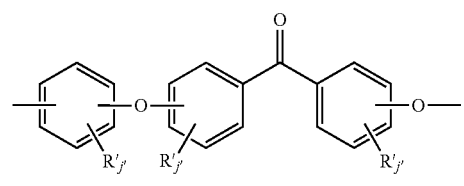
(J-A)

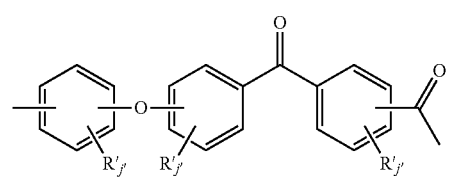
(J-B)

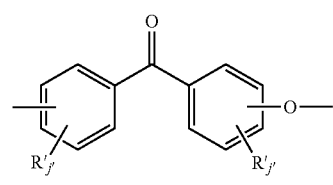
(J-C)

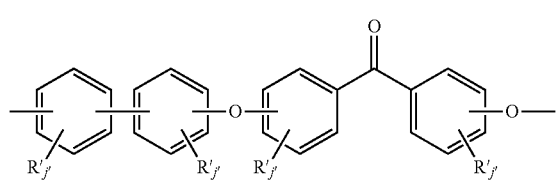
(J-D)

where:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
j' is zero or an integer ranging from 1 to 4.

In recurring unit ($R_{PAEK}$), the respective phenylene moieties may independently have 1,2-, 1,4- or 1,3-linkages to the other moieties different from R' in the recurring unit ($R_{PAEK}$). Preferably, said phenylene moieties have 1,3- or 1,4-linkages, more preferably they have a 1,4-linkage.

In recurring units ($R_{PAEK}$), j' is preferably at each occurrence zero so that the phenylene moieties have no other substituents than those linking the main chain of the polymer.

In some embodiments, the PAEK is poly(ether ether ketone) (PEEK). As used herein, a "poly(ether ether ketone) (PEEK)" denotes any polymer of which more than 50 mol % of the recurring units ($R_{PAEK}$) are recurring units of formula J'-A:

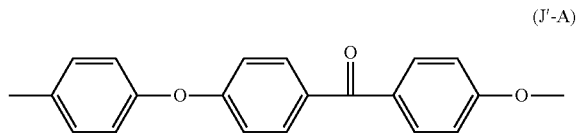
(J'-A)

Preferably at least 60 mol %, 70 mol %, 80 mol %, 90 mol %, 95 mol %, 99 mol %, and most preferably all of recurring units ($R_{PAEK}$) are recurring units (J'-A).

In another preferred embodiment, the PAEK is poly(ether ketone ketone) (PEKK). As used herein, a "poly(ether ketone ketone) (PEKK)" denotes any polymer of which more than 50 mol % of the recurring units ($R_{PAEK}$) are a combination of recurring units of formula J'-B and formula J"-B:

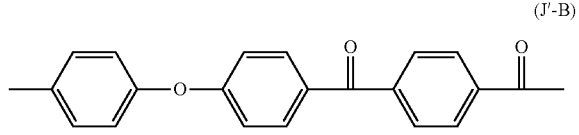
(J'-B)

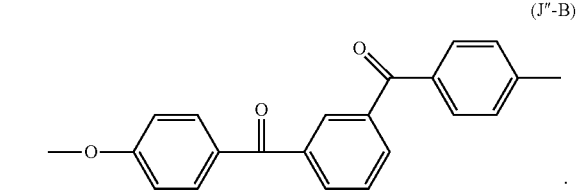
(J"-B)

Preferably at least 60 mol %, 70 mol %, 80 mol %, 90 mol %, 95 mol %, 99 mol %, and most preferably all of recurring units ($R_{PAEK}$) are a combination of recurring units (J'-B) and (J"-B).

In yet another preferred embodiment, the PAEK is poly (ether ketone) (PEK). As used herein, a "poly(ether ketone) (PEK)" denotes any polymer of which more than 50 mol % of the recurring units ($R_{PAEK}$) are recurring units of formula (J'-C):

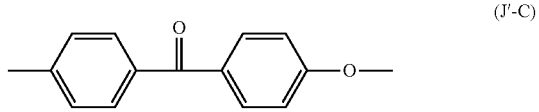
(J'-C)

Preferably at least 60 mol %, 70 mol %, 80 mol %, 90 mol %, 95 mol %, 99 mol %, and most preferably all of recurring units ($R_{PAEK}$) are recurring units (J'-C).

In some embodiments, the PAEK is a PEEK-PEDEK copolymer. As used herein, a "PEEK-PEDEK copolymer"

denotes any polymer of which more than 50 mol % of the recurring units ($R_{PAEK}$) are both recurring units of formula J'-A (PEEK) and formula J'-D (poly(diphenyl ether ketone) (PEDEK)):

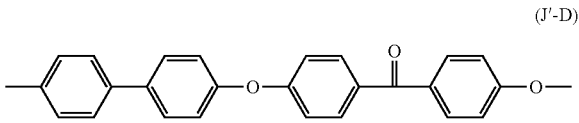

(J'-D)

The PEEK-PEDEK copolymer may include relative molar proportions of recurring units J'-A and J'-D (PEEK/PEDEK) ranging from 95/5 to 60/40. Preferably the sum of recurring units J'-A and J'-D represents at least 60 mol %, 70 mol %, 80 mol %, 90 mol %, 95 mol %, 99 mol %, of recurring units in the PAEK. In some aspects, recurring units J'-A and J'-D represent all of the recurring units in the PAEK.

Most preferably, the PAEK is PEEK. KETASPIRE® PEEK is commercially available from Solvay Specialty Polymers USA, LLC.

Polyethersulfone (PES)

As used herein, a "polyethersulfone (PES)" denotes any polymer of which at least 50 mol % of the recurring units are recurring units of formula (K):

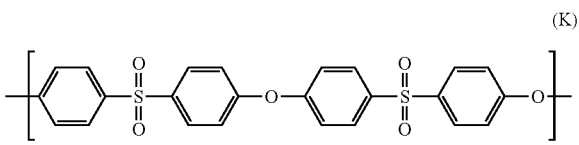

(K)

Preferably at least 60 mol %, 70 mol %, 80 mol %, 90 mol %, 95 mol %, 99 mol %, and most preferably all of the recurring units in the PES are recurring units of formula (K).

PES can be prepared by known methods and is notably available as VERADEL® PESU from Solvay Specialty Polymers USA, LLC.

Reactive Polymers

The at least one PAEK and the PES may be present in either a reactive form (i.e. a reactive polymer) or a non-reactive form.

In their reactive form, the polymers include at least 5, at least 10, at least 15, preferably at least 20, preferably at least 50 microequivalents per gram (µeq/g) of hydroxyl (—OH) or thiol (—SH) end groups. One example of such a reactive polymer is reactive polyether sulfone (rPES), which is available from Solvay Specialty Polymers USA, LLC, as VIRANTAGE® PESU.

In some embodiments, the polymer composition includes at least one reactive polymer (e.g., a rPES or rPAEK) in addition to the at least one PAEK and PES. The rPAEK is preferably selected from a reactive poly(ether ether ketone) (rPEEK), a reactive poly(ether ketone ketone) (rPEKK), a reactive poly(ether ketone) (rPEK), and a reactive PEEK-PEDEK copolymer (r(PEEK-PEDEK)).

Preferably, the total amount of reactive polymers in the polymer composition ranges from 0 to 60 wt. %, 1 to 50 wt. %, 5 to 30 wt. %, 5 to 25 wt. %, 5 to 20 wt. %, 5 to 15 wt. %, most preferably about 10 wt. %, based on the total weight of the polymers in the polymer composition.

In their non-reactive form, the PAEK and PES polymers include one or more non-reactive end groups. The non-reactive end groups are preferably —Cl, —F, or —O—CH$_3$. Preferably the non-reactive polymers include at least 20, preferably more than 50 micro equivalents per gram of non-reactive end groups.

In certain embodiments, the PAEKs and PES are free or substantially free of nitro or nitrile end groups, and the polymer composition is optionally also free of any reagent capable for forming such end groups on the polymers. In some aspects, the PAEKs and PES include only —O—CH$_3$, halogen, hydroxyl (—OH) or aryl end groups.

In some embodiments, the polymer composition may be free or substantially free of rPES and/or rPAEKs.

Alkali Metal Carbonate

The polymer composition includes at least one alkali metal carbonate in an amount ranging from about 0.05 to about 2 wt. %, about 0.1 to about 1.8 wt. %, about 0.1 to about 1.6 wt. %, about 0.1 to about 1.5 wt. %, about 0.1 to about 1.3 wt. %, about 0.1 to about 1.0 wt. %, about 0.1 to about 0.8 wt. %, about 0.1 to about 0.5 wt. % based on the total weight of polymers in the polymer composition. In some embodiments, the amount of alkali metal carbonate ranges from about 0.1 to about 0.5 wt. %, about 0.2 to about 0.5 wt. %, about 0.4 to about 0.5 wt. % based on the total weight of polymers in the polymer composition. In some embodiments, the amount of alkali metal carbonate is less than or equal to 1.0 wt. %, 0.9 wt. %, 0.8 wt. %, 0.7 wt. %, 0.6 wt. %, 0.5 wt. %, 0.4 wt. %, 0.3 wt. %, 0.2 wt. %, 0.1 wt. % based on the total weight of polymers in the polymer composition.

The alkali metal carbonate may be selected from sodium carbonate, potassium carbonate, cesium carbonate and lithium carbonate. Potassium carbonate is preferred. Mixtures of two or more alkali metal carbonates may be used.

In some aspects, the particle size D50 (median diameter or the medium value of the particle size distribution) ranges from 2 microns to 1000 microns, preferably from 2 to 500 microns, most preferably from 3 to 200 microns.

Acid Component

It has surprisingly been discovered that organic and inorganic acid components having a pKa <7.5, preferably <7 are able to stabilize the melt viscosity of the polymer composition of the invention. Non-limiting examples of organic and inorganic components having a pKa <7.5 are sodium hydrogen phosphate (NaH$_2$PO$_4$), monosodium citrate, sodium hydrogen oxalate, and sodium hydrogen phthalate. Inorganic components, such as, for example, NaH$_2$PO$_4$, having a pKa <7 are preferred. Excellent results were obtained with organic and inorganic components having a pKa as follows: 2.5<pKa<7.5, preferably 3<pKa<7. The organic or inorganic acid component having a pKa <7.5 may be present in an amount ranging from 0.05 wt. % to 5 wt. %, preferably from 0.1 wt. % to 2 wt. %, more preferably from 0.2 wt. % to 1 wt. %, based on the total weight of polymers in the polymer composition.

Optional Reinforcing Fillers

A large selection of reinforcing fillers may be added to the polymer composition. They are preferably selected from fibrous and particulate fillers. A fibrous reinforcing filler is considered herein to be a material having length, width and thickness, wherein the average length is substantially larger than both the width and thickness. Preferably, such a material has an aspect ratio, defined as the average ratio between the length and the smallest of the width and thickness of at least 5. Preferably, the aspect ratio of the reinforcing fibers is at least 10, more preferably at least 20, still more preferably at least 50. The particulate fillers have an aspect ratio of at most 5, preferably at most 2.

Preferably, the reinforcing filler is selected from mineral fillers, such as talc, mica, titanium dioxide, kaolin, calcium carbonate, calcium silicate, magnesium carbonate; glass fibers; carbon fibers, boron carbide fibers; wollastonite; silicon carbide fibers; boron fibers, graphene, carbon nanotubes (CNT), and the like.

The reinforcing filler may be present in the polymer composition in an amount of at least 5 wt. %, preferably at least 10 wt. %, more preferably at least 15 wt. %, based on the total weight of the polymer composition.

The reinforcing filler is also preferably present in an amount of at most 60 wt. %, more preferably at most 50 wt. %, still more preferably at most 40 wt. %, based on the total weight of the polymer composition.

Preferably, the amount of the reinforcing filler ranges from 0.1 wt. % to 60 wt. %, more preferably from 5 wt. % to 50 wt. %, still more preferably from 10 wt. % to 40 wt. % of the polymer composition. According to some embodiments, the polymer composition is free of a fibrous filler. Alternatively the polymer composition may be free of a particulate filler. Preferably, the polymer composition is free of reinforcing fillers.

Additional Ingredients

In some aspects, the polymer composition may include one or more optional additives such as a colorant such as a dye and/or a pigment, for example, titanium dioxide, zinc sulfide, zinc oxide, ultraviolet light stabilizers, heat stabilizers, antioxidants such as organic phosphites and phosphonites, acid scavengers, processing aids, nucleating agents, lubricants, flame retardants, a smoke-suppressing agents, an anti-static agents, anti-blocking agents, and/or conductivity additives such as carbon black.

When one or more additional ingredients are present, their total weight is preferably less than 20 wt. %, less than 10 wt. %, less than 5 wt. % and most preferably less than 2 wt. %, based on the total weight of polymer composition.

Preferred Polymer Compositions

Preferred polymer compositions are shown below in Table 1. Each polymer composition may include other ingredients in addition to those listed. Each polymer composition also includes at least one alkali metal carbonate, preferably potassium carbonate, in an amount ranging from 0.05 to about 2 wt. %, or in another amount as disclosed herein.

TABLE 1

| Polymer Composition | Polymer (A) | Polymer (B) | Reactive Polymer | Acid Component |
|---|---|---|---|---|
| 1 | PEEK | PES | rPES | optional |
| 2 | PEEK | PES | rPEEK | optional |
| 3 | PEEK | PES | — | included |
| 4 | PEEK | — | rPES | optional |
| 5 | — | PES | rPEEK | optional |
| 6 | PEKK | PES | rPES | optional |
| 7 | PEKK | PES | rPEKK | optional |
| 8 | PEKK | PES | — | included |
| 9 | PEKK | — | rPES | optional |
| 10 | — | PES | rPEKK | optional |
| 11 | PEK | PES | rPES | optional |
| 12 | PEK | PES | rPEK | optional |
| 13 | PEK | PES | — | included |
| 14 | PEK | — | rPES | optional |
| 15 | — | PES | rPEK | optional |
| 16 | PEEK-PEDEK copolymer | PES | rPES | optional |
| 17 | PEEK-PEDEK copolymer | PES | r(PEEK-PEDEK) | optional |
| 18 | PEEK-PEDEK copolymer | PES | — | included |
| 19 | PEEK-PEDEK copolymer | — | rPES | optional |
| 20 | — | PES | r(PEEK-PEDEK) | optional |

In the polymer composition, the concentration of each of the PAEK, the PES, the rPES and the rPAEK is independently selected from 0 wt. %, preferably at least 1 wt. %, 2 wt. %, 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, 98 wt. %, 99 wt. % of the total weight of polymers in the polymer composition.

In some embodiments, the polymer composition includes 80 wt. %, preferably 65 wt. %, more preferably 50 wt. % of PAEK (e.g., PEEK) or PES and 20 wt. %, preferably 35 wt. %, preferably 50 wt. %, respectively, of the other of the PAEK or PES, based on the total weight of the polymers in the polymer composition.

In some aspects, the polymer composition includes (i) from 20 wt. % to 80 wt. %, preferably 30 wt. % to 70 wt. %, 40 wt. % to 60 wt. %, 45 wt. % to 55 wt. %, most preferably about 45% wt. % of the at least one PAEK, (ii) from 80 wt. % to 20 wt. %, preferably 70 wt. % to 30 wt. %, 60 wt. % to 40 wt. %, 55 wt. % to 45 wt. %, most preferably about 45 wt. % of the PES, and (iii) from 1 wt. % to 20 wt. %, preferably 5 wt. % to 15 wt. %, most preferably about 10 wt. % of the rPES or rPAEK, based on the total weight of the polymers in the polymer composition.

Exemplary Properties of the Polymer Composition

Figure 3:
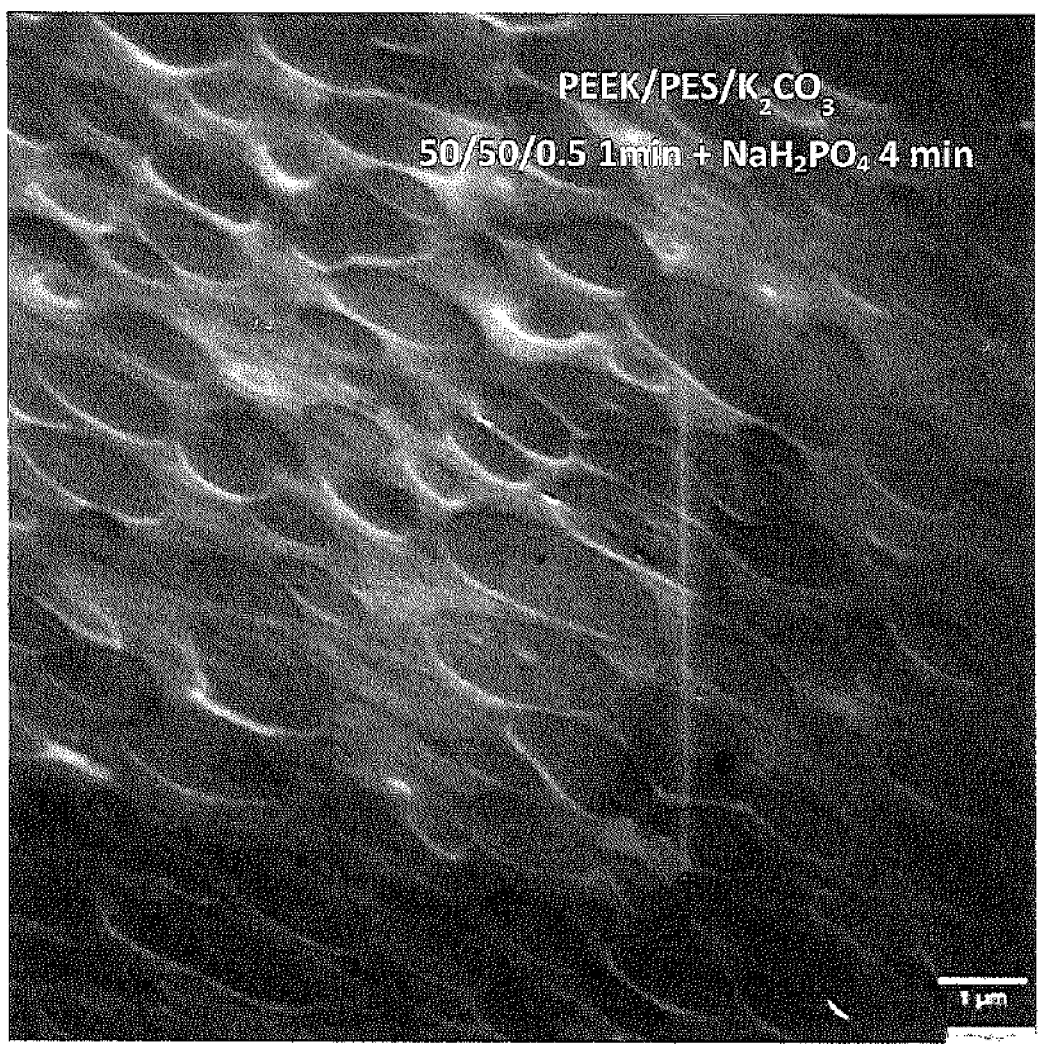
FIG. 3 is a TEM image of the polymer composition of Example 1.

The polymer composition may include a dispersed phase that is dispersed in a continuous phase or matrix. An example of a dispersed phase is shown in FIG. 3.

In some embodiments, the average surface area per dispersed particle is preferably less than or equal to about 4 $\mu m^2$, about 3 $\mu m^2$, about 2 $\mu m^2$, about 1 $\mu m^2$.

In some embodiments, the maximum diameter of particles of the dispersed phase is ≤3 μm, preferably ≤2 μm, ≤1 μm, ≤0.8 μm, ≤0.6 μm, ≤0.4 μm, most preferably ≤0.1 μm.

In alternative embodiments, the polymer blends may include co-continuous phases characterized by the presence of continuous ribbons of the polymer components when viewed by transmission electron microscopy (TEM). In such embodiments, the average width of the ribbons is preferably less than or equal to about 3 μm, more preferably less than or equal to about 2 μm, where the average width is calculated by taking 10 random measurements of the ribbon width, discarding the longest and shortest measurements, and dividing the sum of the remaining measurements by 8.

The polymer composition may exhibit at least two different glass transition temperatures (Tg) corresponding to each of the polymers in the polymer composition; however, these Tgs may be different (i.e. shifted) as compared with the Tgs of the same polymers when not in the polymer composition. In some embodiments, the difference between the respective Tgs in the polymer composition (the ΔTg) is at least 0.5° C., preferably at least 1° C., more preferably from 5 to 50° C., even more preferably from 5 to 10° C.

In some preferred embodiments, the polymer composition is free or substantially free of die swell when the polymer composition is extruded as a melt from a melt-mixing apparatus and the temperature of the melt ranges from 300 to 400° C.

Method of Making the Polymer Composition

In some embodiments, the invention includes a method of making the polymer compositions described herein by melt mixing components selected from the group consisting of: (i) at least one a poly(aryl ether ketone) (PAEK), (ii) a poly(ether sulfone) (PES), (iii) a reactive poly(ether sulfone) (rPES), (iv) a reactive poly(aryl ether ketone) (rPAEK), (v) an acid component having a pKa ≤7.5, and (vi) about 0.05 to about 2 wt. % of at least one alkali metal carbonate, based on the total weight of polymers in the polymer composition, where the method includes melt mixing:
- components (i), (ii), (iii), (vi), and optionally (v),
- components (i), (ii), (iv), (vi), and optionally (v),
- components (i), (ii), (v), and (vi),
- components (iii), (iv), and (vi),
- components (iii), (iv), (v), and (vi),
- components (i), (iii), (vi), and optionally (v), or
- components (ii), (iv), (vi), and optionally (v).

The components of the mixture may be added or mixed in any order, in any amount or fraction their total amount, and may be mixed separately or simultaneously.

The preparation of the polymer composition can be carried out by any known melt-mixing process that is suitable for preparing thermoplastic molding compositions. Such a process may be carried out by heating the polymers above the melting temperature of the semi-crystalline polymers to form a melt of the polymers and/or above the Tg of the amorphous polymers. In some embodiments, the processing temperature ranges from about 250-450° C., preferably from about 280-420° C. Preferably, the processing temperature is at least 15° C., preferably at least 50° C., preferably at least 100° C. greater than the glass transition temperature (Tg) of the highest Tg polymer in the polymer composition and/or at least 15° C. greater than the melting temperature (Tm) of the highest Tm polymer in the polymer composition.

In the some aspects of the process for the preparation of the polymer composition, the components for forming the polymer composition are fed to the melt-mixing apparatus and melt-mixed in that apparatus. Suitable melt-mixing apparatuses are, for example, kneaders, Banbury mixers, single-screw extruders, and twin-screw extruders. Preferably, use is made of an extruder fitted with means for dosing the desired components to the extruder, either to the extruder's throat or to the melt. Preferably the extruder is equipped with one or more ports allowing dosing to the melt at different barrels during the extrusion process.

The components may be fed simultaneously as a powder mixture or granule mixture, also known as dry-blend, or may be fed separately.

In some embodiments, all of the polymers and the alkali metal carbonate are added to the throat of the extruder, preferably simultaneously or substantially simultaneously. In other aspects, one or more of the polymers may be added with the alkali metal carbonate to the throat of the extruder, and one or more other polymers is subsequently added to the melt at a barrel of the extruder. For example, the PAEK and rPES may be added with the alkali metal carbonate to the throat of the extruder, and PES may be added subsequently at a downstream barrel of the extruder. When added, the acid component may be added at the throat of the extruder, or to the melt at any barrel of the extruder. Preferably, the acid component is added to the melt at a downstream barrel such that it contacts the melt shortly before the melt is extruded. Preferably, the acid component is added at a time after the addition of the alkali metal carbonate.

In exemplary embodiments, multiple-pass extrusion may be performed. In multiple-pass extrusion, extrudate from a first pass is reintroduced into the extruder, preferably at the throat, such that it passes through the extruder a second time. In multiple-pass extrusion, two, three, four, or more passes may be performed, and the polymers, alkali metal carbonate, acid component, or other ingredients may be added at any point on the extruder line in any pass. For example, the at least one PAEK may be added to the throat of the extruder with the alkali metal carbonate, the extrudate from a first pass may then be recycled to the extruder with addition of the PES, and the acid component can be added toward the end of the second pass. Alternatively, the extrudate resulting from the second pass may be recycled for a third pass during which, for example, an acid component and/or filler material may be added to the melt prior to extrusion into a final product.

In some aspects, at least two passes may be performed, and components maybe be added to the extrudate and/or a process performed (for example, mixing) on the extrudate before it is recycled to the extruder for one or more additional passes.

The extruder may be operated at any suitable speed. The extruder speed and the temperatures of the extruder barrels may be constant or varied. Preferably the extruder screw(s) are rotated at about 100 to about 900, preferably from about 200 to about 500 rpm; however, speed and temperature may be adjusted based on the particular polymer composition being blended.

The "total residence time" as used herein means the total time that the longest-residing component spends in the extruder, including multiple passes, if any. The total residence time preferably ranges from about 15 seconds to about 4 minutes, preferably from about 30 seconds to about 2 minutes.

The polymer compositions described herein are advantageously provided in the form of pellets, which may be used in injection molding or extrusion processes known in the art.

Exemplary embodiments are directed a method including:
- (a1) contacting the at least one PAEK, the PES, and the alkali metal carbonate to form a first initial mixture;
- (a2) contacting the at least one a PAEK with the alkali metal carbonate to form a second initial mixture, and subsequently contacting the second initial mixture with the PES to form a second mixture;
- (a3) contacting the PES with the alkali metal carbonate to form a third initial mixture, and subsequently contacting the third initial mixture with the at least one a PAEK to form a third mixture; or
- (a4) contacting the at least one a PAEK and the PES to form a fourth initial mixture and subsequently contacting the fourth initial mixture with the alkali metal carbonate to form a forth mixture; and
- (b) contacting the first initial mixture, the second mixture, the third mixture, or the fourth mixture with the acid component as described herein.

In alternative embodiments, the at least one PAEK and/or the PES described in steps (a1), (a2), (a3) or (a4) above may be a reactive polymer (i.e. may be rPAEK or rPES, respectively).

In some embodiments, the method includes:
- (a1) contacting the at least one PAEK, the PES, at least one reactive polymer (e.g. rPES or rPAEK) and the alkali metal carbonate to form a first initial mixture;
- (a2) contacting the at least one a PAEK, the at least one reactive polymer, and the alkali metal carbonate to form a second initial mixture, and subsequently contacting the second initial mixture with the PES to form a second mixture.

(a3) contacting the PES, the at least one reactive polymer, and the alkali metal carbonate to form a third initial mixture, and subsequently contacting the third initial mixture with the at least one a PAEK to form a third mixture; or
(a4) contacting the at least one a PAEK, the PES, and the at least one reactive polymer to form a fourth initial mixture, and subsequently contacting the fourth initial mixture with the alkali metal carbonate to form a forth mixture; and
(b) optionally contacting the first initial mixture, the second mixture, the third mixture, or the fourth mixture with the acid component as described herein.

In some embodiments, the method includes:
(a1) contacting the at least one PAEK, the PES, and the alkali metal carbonate to form a first initial mixture, and subsequently contacting the first initial mixture with the at least one reactive polymer to form a first mixture;
(a2) contacting the at least one a PAEK and the alkali metal carbonate to form a second initial mixture, and subsequently contacting the second initial mixture with the PES and the at least one reactive polymer to form a second mixture;
(a3) contacting the PES and the alkali metal carbonate to form a third initial mixture, and subsequently contacting the third initial mixture with the at least one a PAEK and the at least one reactive polymer to form a third mixture; or
(a4) contacting the at least one a PAEK and the PES to form a fourth initial mixture, and subsequently contacting the fourth initial mixture with the alkali metal carbonate and the at least one reactive polymer to form a forth mixture; and
(b) optionally contacting the first mixture, the second mixture, the third mixture, or the fourth mixture with the acid component as described herein.

Shaped Articles Including the Polymer Composition

Exemplary embodiments also include articles comprising the above-described polymer composition.

The articles may be made from the polymer composition using any suitable melt-processing method. In particular, they may be made by injection molding, extrusion molding, roto-molding, or blow-molding.

The polymer composition may be well suited for the manufacture of articles useful in a wide variety of end uses.

The invention will be herein after illustrated in greater detail in the following section by means of non-limiting examples.

Should the disclosure of any patents, patent applications, and publications which are incorporated herein by reference conflict with the description of the present application to the extent that it may render a term unclear, the present description shall take precedence."

EXAMPLES

Comparative Examples 1, 2, and 3 and Examples 1 and 2

Comparative Example 1: blend PEEK/PES 50/50 parts, for 5 min residence time.
Comparative Example 2: blend PEEK/PES/$K_2CO_3$ 50/50/0.5 parts, for 5 min residence time.
Comparative Example 3: blend 7 g of PEEK/PES/$K_2CO_3$ 50/50/0.5 parts, for 1 min, then introduce 1 g of a mixture of PEEK/PES/$Na_2HPO_4$ 45/45/10 wt. % and blend for 4 min (total of 5 min residence time).
Example 1: blend 7 g of PEEK/PES/$K_2CO_3$ 50/50/0.5 parts, for 1 min, then introduce 1 g of a mixture of PEEK/PES/$NaH_2PO_4$ 40/40/20 wt. % and blend for 4 min (total of 5 min residence time).
Example 2: blend 7 g of PEEK/PES/$K_2CO_3$ 50/50/0.5 parts, for 1 min, then introduction of 1 g of a mixture of PEEK/PES/$NaH_2PO_4$ 45/45/10 wt. % and blend for 4 min (total of 5 min residence time).

Materials:
Poly(ether ether ketone) (PEEK) Ketaspire® KT-880 from Solvay Specialty Polymers USA, LLC.
Poly(ether sulfone) (PES) Veradel® PESU 3600P from Solvay Specialty Polymers USA, LLC.
Potassium carbonate $K_2CO_3$ UNID EF-80
Sodium phosphate monobasic $NaH_2PO_4$ (pKa=6.8)
Sodium phosphate dibasic $Na_2HPO_4$ (pKa=12.4)

Compounding:
The blends were compounded in a DSM Xplore® twin-screw (100 rpm) extruder heated at 400° C. and equipped with a recirculation loop allowing control of residence time. The materials (total of 7 g) were introduced simultaneously and mixed for a time (residence time) before being extruded into a strand.

Measurements:
The torque needed to rotate the extruder screws was measured during blending. The torque correlates with the viscosity of the molten blend with a higher force indicating a higher viscosity.

Figure 2:
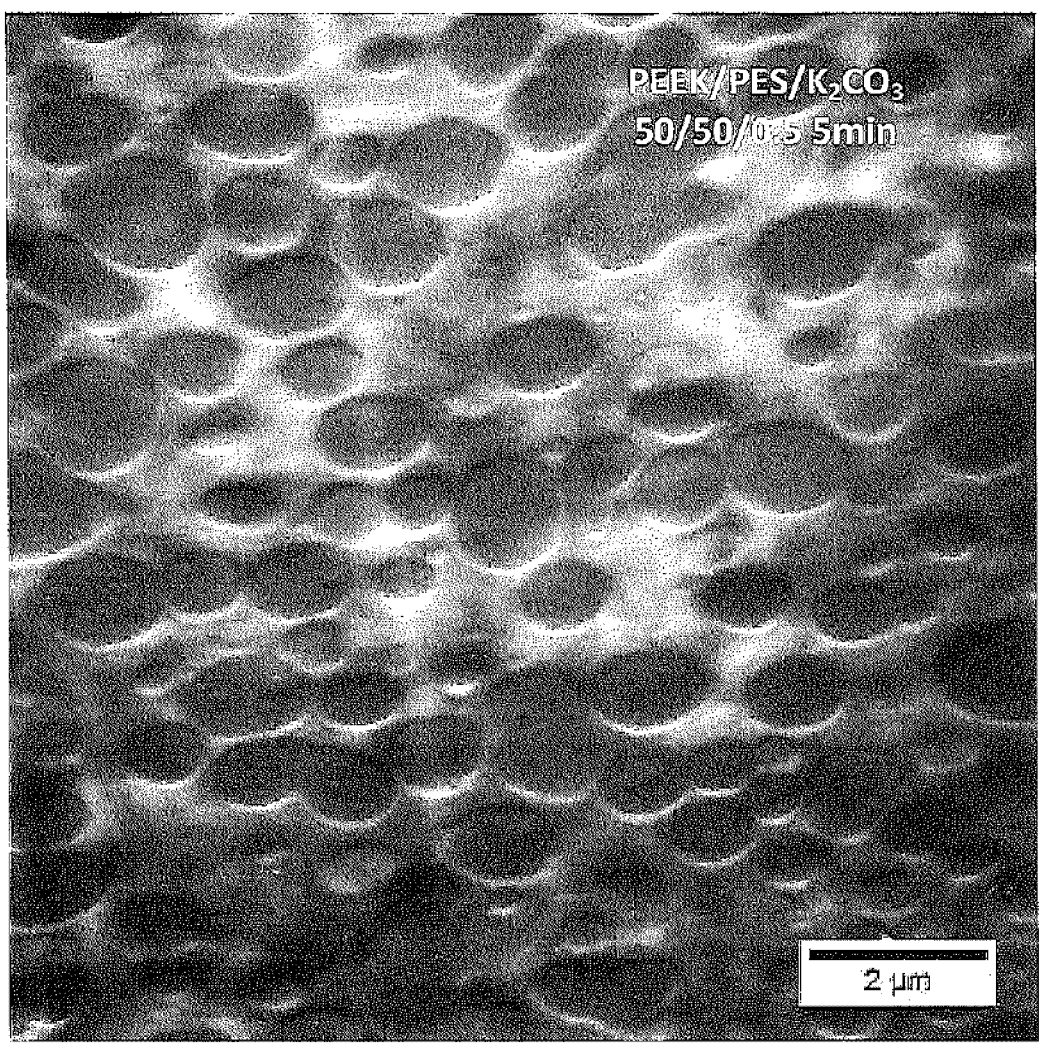
FIG. 2 is a transmission electron microscopy (TEM) image of the polymer composition of Comparative Example 2.

Results:
The polymer compositions and measurements are shown below in Table 2. The morphology of selected polymer compositions is shown in FIGS. 1-3.

TABLE 2

|  | C1 | C2 | C3 | E1 | E2 |
| --- | --- | --- | --- | --- | --- |
| PEEK (parts) | 50 | 50 | 50 | 50 | 50 |
| PES (parts) | 50 | 50 | 50 | 50 | 50 |
| $K_2CO_3$ (parts) | — | 0.5 | 0.5 | 0.5 | 0.5 |
| Residence time (min) | 5 | 5 | 1 | 1 | 1 |
| Introduction of 1 g of a mixture of PEEK/PES/x |  |  |  |  |  |
| PEEK (wt. %) | — | — | 45 | 40 | 45 |
| PES (wt. %) | — | — | 45 | 40 | 45 |
| $Na_2HPO_4$ (wt. %) | — | — | 10 | — | — |
| $NaH_2PO_4$ (wt. %) | — | — | — | 20 | 10 |
| Residence time (min) | — | — | 4 | 4 | 4 |
| ΔForce (N) - 0:45 min | N.D.* | 232 | 225 | 205 | 65 |
| Intro mixture - 1:0 min | — | — | Yes | Yes | Yes |
| ΔForce (N) - 1:15 min | N.D. | 422 | 502 | 643 | 287 |
| ΔForce (N) - 1:45 min | N.D. | 745 | 602 | 603 | 260 |
| ΔForce (N) - 2:00 min | N.D. | 887 | 747 | 610 | 255 |
| ΔForce (N) - 2:30 min | N.D. | 1,127 | 1,045 | 595 | 252 |
| ΔForce (N) - 3:00 min | N.D. | 1,225 | 1,112 | 583 | 230 |
| ΔForce (N) - 3:30 min | N.D. | 1,222 | 1,162 | 573 | 275 |
| ΔForce (N) - 4:00 min | N.D. | 1,227 | 1,187 | 560 | 327 |
| ΔForce (N) - 4:30 min | N.D. | 1,227 | 1,192 | 553 | 405 |
| ΔFinal force (N) | 110 | 1,222 | 1,210 | 553 | 435 |

*N.D. indicates a value which was not determined.

FIG. 1 is an SEM scan of the polymer composition of Comparative Example 1, which is a PEEK/PES 50/50 wt. % blend that does not include any alkali metal carbonate. FIG. 2 is a TEM scan of the polymer composition of Comparative Example 2, which is a PEEK/PES 50/50 wt. % blend including 0.5 wt. % of $K_2CO_3$. Comparison of FIG. 1 and FIG. 2 clearly illustrates that the introduction of 0.5 wt. % of $K_2CO_3$ to the PEEK/PES 50/50 wt. % blend results in compatibilzation of the blend as indicated by the reduction of the size of the dispersed phase. Nevertheless, the addition of $K_2CO_3$ also resulted in a significant increase in the viscosity of the blend, as shown by the more than 10-fold increase in the ΔFinal force (N) between Comparative Example 1 and Comparative Example 2 in Table 2.

It was unexpectedly discovered, however, that the introduction of $NaH_2PO_4$ after 1 min of mixing (Examples 1 and 2) immediately stopped the increase in viscosity—resulting in a polymer composition suitable for further processing applications where a lower viscosity is desirable—while retaining the compatibilization observed with the addition of $K_2CO_3$ (FIG. 3 showing a TEM scan of Example 1). It was also surprisingly discovered, as shown by Comparative Example 3, that the introduction of $Na_2HPO_4$ instead of $NaH_2PO_4$ did not stop the increase in viscosity observed in Comparative Example 2.

Comparative Examples 4, 5, and 6 and Example 3

Comparative Example 4: blend PEEK/PES 50/50 parts, for 5 min residence time.
Comparative Example 5: blend PEEK/PES/rPES 45/45/10 parts, for 5 min residence time.
Comparative Example 6: blend PEEK/PES/rPES/ZnO 45/45/10/2 parts, for 3 min residence time.
Example 3: blend PEEK/PES/rPES/$K_2CO_3$ 45/45/10/0.5 parts, for 3 min residence time.
Materials:
  Poly(ether ether ketone) (PEEK) Ketaspire® KT-880 from Solvay Specialty Polymers USA, LLC.
  Poly(ether sulfone) (PES) Veradel® PESU 3600P from Solvay Specialty Polymers USA, LLC.
  Reactive poly(ether sulfone) (rPES): rPES synthesized according to a known process from 4,4'-dichlorodiphenyl sulfone, bisphenol S (in excess), potassium carbonate (in excess) in sulfolane as a solvent. The end-group titration of the rPES polymer gave:
    concentration of hydroxyl end-groups [—OH]=219 µeq/g
    concentration of potassium phenoxide end-groups [—OK]=60 µeq/g
    concentration of chloro end-groups [—Cl]=7 µeq/g
    Number-average molecular weight (Mn)=2,000,000/ ([—OH]+[—OK]+[—Cl])=7,000 g/mol
  Potassium carbonate $K_2CO_3$ UNID EF-80
  Zinc Oxide ZnO
Compounding:
  The blends were compounded according to the method described for Example 1 above.
Measurements:
  The torque needed to rotate the extruder screws was measured as in Example 1 above.
  The level of die swell was observed at the exit of the extruder and ranked as follows: -- very large die swell, - some die swell, + limited die swell, ++ no die swell.
  The thermal properties, i.e., melting temperature and crystallization temperature were determined by DSC.
  The morphology of the blend was analyzed by scanning electron microscopy (SEM) and transmission electron microscopy (TEM) to give a maximum diameter of the dispersed phase.
Results:
  The blend compositions and measurements are shown below in Table 3. The morphology of the blends is shown in FIGS. 1 and 4-6.

TABLE 3

|  | C4 | C5 | C6 | E3 |
|---|---|---|---|---|
| PEEK (parts) | 50 | 45 | 45 | 45 |
| PES (parts) | 50 | 45 | 45 | 45 |
| rPES (parts) | – | 10 | 10 | 10 |
| ZnO (parts) | – | – | 2 | – |
| $K_2CO_3$ (parts) | – | – | – | 0.5 |
| Residence time (min) | 5 | 5 | 3 | 3 |
| Initial force (N) | 900 | 753 | 920 | 1,788 |
| Final force (N) | 1010 | 850 | 1010 | 3,028 |
| Die swell | -- | -- | - | ++ |
| Tc (° C.) | 278 | 273 | 269 | 267 |
| Tm (° C.) | 340 | 340 | 341 | 340 |
| Morphology (max diameter) | 30 µm | 10 µm | co-continuous 4 µm | 1 µm |

Figure 4:
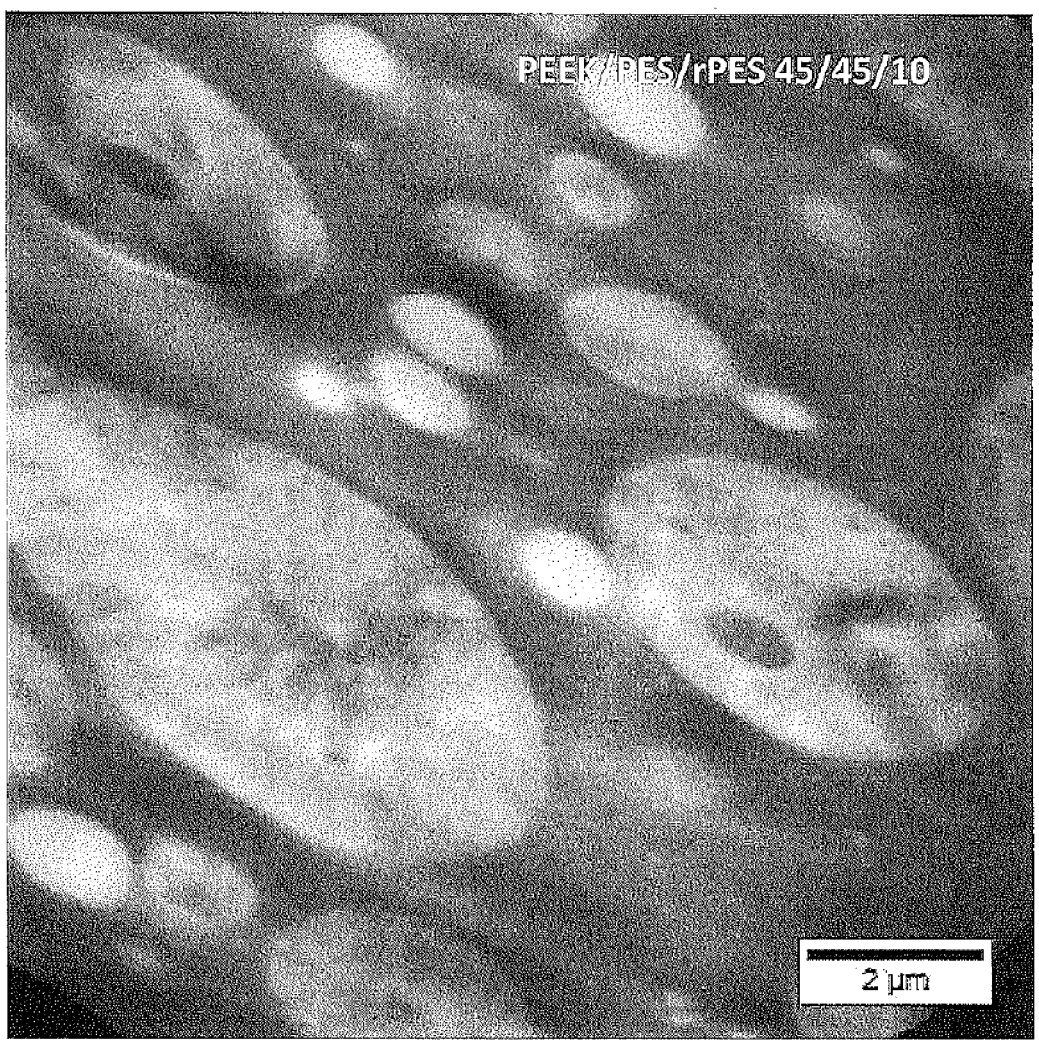
FIG. 4 is a TEM image of the polymer composition of Comparative Example 5.
Figure 5:
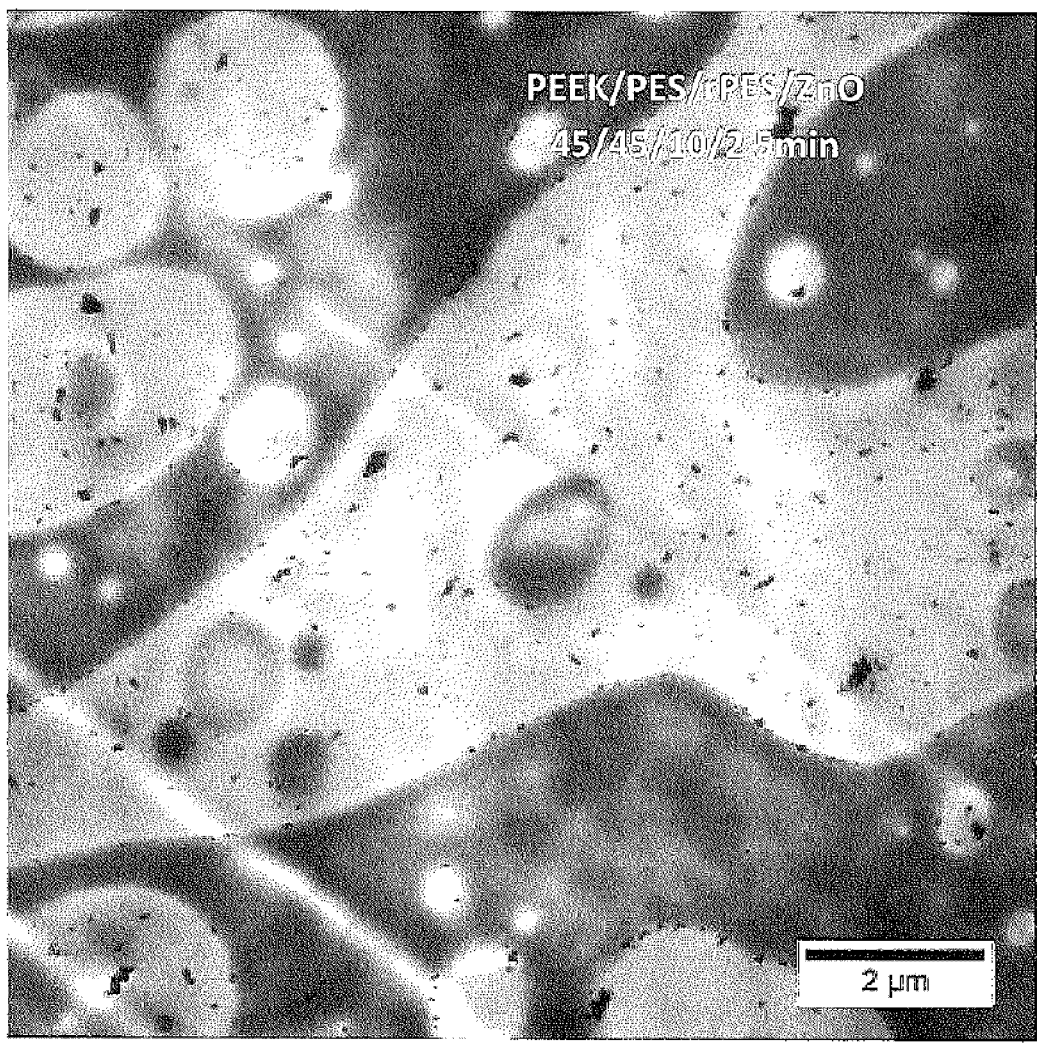
FIG. 5 is a TEM image of the polymer composition of Comparative Example 6.

PEEK and PES are clearly immiscible as shown in FIG. 1. As shown in FIG. 4, introduction of rPES (hydroxyl terminated PES) did not significantly compatibilize the polymers and very large die swell was observed. Moreover, as shown in FIG. 5, the further addition of the base, ZnO, also did not result in a dramatic change in the morphology of the PEEK and PES blend, and some die swell was still observed.

Figure 6:
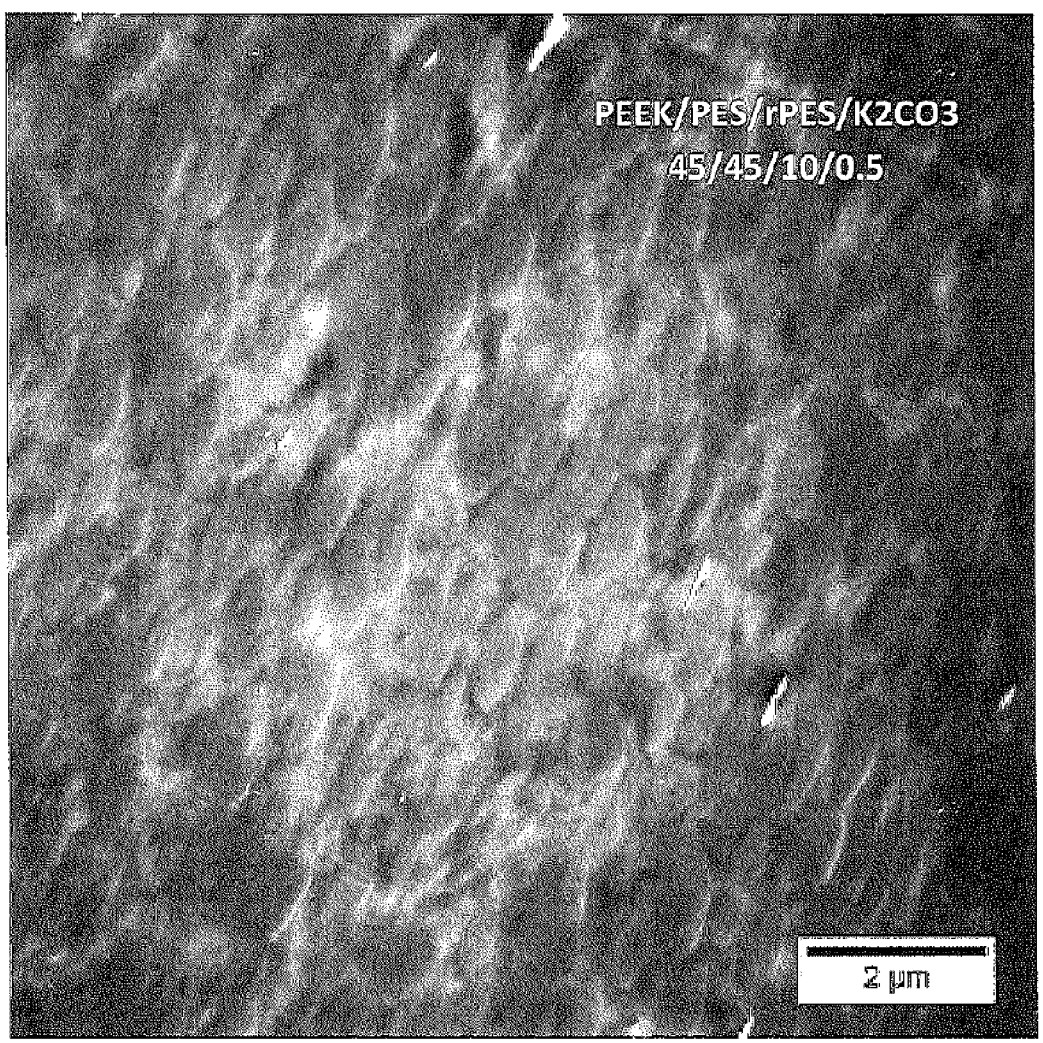
FIG. 6 is a TEM image of the polymer composition of Example 3.

Surprisingly, however, when another base, $K_2CO_3$, was added to the PEEK, PES and rPES polymer composition, exceptional compatibilization of PEEK and PES was observed, as shown by the dispersed phase of Example 3 exhibiting a diameter of less than 1 µm (FIG. 6). In addition, the polymer composition of Example 3 also unexpectedly exhibited no die swell, which is advantageous, for example, in extruding strands of a regular size.

Should the disclosure of any patents, patent applications, and publications which are incorporated herein by reference conflict with the description of the present application to the extent that it may render a term unclear, the present description shall take precedence.

The invention claimed is:

1. A polymer composition comprising components selected from the group consisting of:
  (i) at least one poly(aryl ether ketone) (PAEK),
  (ii) a poly(ether sulfone) (PES),
  (iii) a reactive poly(ether sulfone) (rPES),
  (iv) a reactive poly(aryl ether ketone) (rPAEK),
  (v) an acid component having a pKa ≤7.5, and
  (vi) from about 0.05 to about 2 wt. % of at least one alkali metal carbonate, based on the total weight of polymers in the polymer composition,
  wherein the polymer composition comprises:
  components (i), (ii), (iii), (vi), and optionally (v),
  components (i), (ii), (iv), (vi), and optionally (v),
  components (i), (ii), (v), and (vi),
  components (iii), (iv), and (vi),
  components (iii), (iv), (v), and (vi),
  components (i), (iii), (vi), and optionally (v), or
  components (ii), (iv), (vi), and optionally (v).

2. The polymer composition of claim 1, wherein the polymer composition does not comprise solvent(s) or comprises solvent(s) in an amount not exceeding 2 wt. %, based on the total weight of the polymer composition.

3. The polymer composition of claim 1, wherein the polymer composition comprises components (i), (ii), (iii), (vi), and optionally (v).

4. The polymer composition of claim 1, wherein the polymer composition comprises components (i), (ii), (v), and (vi).

5. The polymer composition of claim 1, wherein the poly(aryl ether ketone) (PAEK) is selected from the group consisting of a poly(ether ether ketone) (PEEK), a poly(ether ketone ketone) (PEKK), a poly(ether ketone) (PEK), a PEEK-poly(diphenyl ether ketone) copolymer (PEEK-PEDEK copolymer), and combinations thereof.

6. The polymer composition of claim 1, wherein the at least one alkali metal carbonate comprises sodium carbonate, potassium carbonate, lithium carbonate, cesium carbonate, or combinations thereof.

7. The polymer composition of claim 1, wherein the at least one alkali metal carbonate is potassium carbonate in an amount ranging from about 0.1 to about 0.5 wt. %, based on the total weight of the polymers in the polymer composition.

8. The polymer composition of claim 1, wherein the polymer composition has a dispersed phase with a surface area per dispersed particle of about 4 $\mu m^r$.

9. The polymer composition of claim 1, wherein the polymer composition is free or substantially free of die swell when extruded as a melt from an extruder, the melt having a temperature ranging from 300 to 400° C.

10. The polymer composition of claim 1, wherein the at least one poly(aryl ether ketone) (PAEK) and the poly(ether sulfone) (PES) have only —O—$CH_3$, halogen, hydroxyl (OH), or aryl end groups.

11. The polymer composition of claim 1, wherein the acid component is an inorganic acid component.

12. The polymer composition of claim 11, wherein the acid component is $NaH_2PO_4$.

13. A method of making a polymer composition comprising melt mixing components selected from the group consisting of:
(i) at least one poly(aryl ether ketone) (PAEK),
(ii) a poly(ether sulfone) (PES),
(iii) a reactive poly(ether sulfone) (rPES),
(iv) a reactive poly(aryl ether ketone) (rPAEK),
(v) an acid component having a pKa 7.5, and
(vi) about 0.05 to about 2 wt. % of at least one alkali metal carbonate, based on the total weight of polymers in the composition,
wherein the method comprises melt mixing:
components (i), (ii), (iii), (vi), and optionally (v),
components (i), (ii), (iv), (vi), and optionally (v),
components (i), (ii), (v), and (vi),
components (iii), (iv), and (vi),
components (iii), (iv), (v), and (vi),
components (i), (iii), (vi), and optionally (v), or
components (ii), (iv), (vi), and optionally (v).

14. A polymer composition made by the method of claim 13.

15. A shaped article comprising the polymer composition of claim 1.

* * * * *